(12) United States Patent
Benjamin et al.

(10) Patent No.: US 7,247,206 B2
(45) Date of Patent: *Jul. 24, 2007

(54) MEDIUM APPLICATION DEVICE

(75) Inventors: Méndez-Gallon Benjamin, Königsbronn (DE); Ueberschär Manfred, Dettingen (DE)

(73) Assignee: Voith Paper Patent, GmbH (DE)

( * ) Notice: Subject to any disclaimer, the term of this patent is extended or adjusted under 35 U.S.C. 154(b) by 0 days.

This patent is subject to a terminal disclaimer.

(21) Appl. No.: 10/802,495

(22) Filed: Mar. 17, 2004

(65) Prior Publication Data

US 2004/0216663 A1    Nov. 4, 2004

Related U.S. Application Data

(63) Continuation of application No. 10/221,517, filed on Sep. 13, 2002, now abandoned.

(51) Int. Cl.
 *B05B 5/02* (2006.01)
(52) U.S. Cl. .................. 118/623; 118/DIG. 4
(58) Field of Classification Search .......... 118/621, 118/623, DIG. 4; 427/472, 482, 483, 485, 427/598, 599
 See application file for complete search history.

(56) References Cited

U.S. PATENT DOCUMENTS

| | | | | |
|---|---|---|---|---|
| 3,206,323 A * | 9/1965 | Miller et al. ................. | 430/531 |
| 3,335,026 A | 8/1967 | De Geest et al. .......... | 117/93.4 |
| 3,470,274 A * | 9/1969 | Sandiford ................... | 264/468 |
| 3,681,138 A * | 8/1972 | Ankenbrand et al. ....... | 427/599 |
| 4,060,649 A * | 11/1977 | Coleman ..................... | 427/79 |
| 4,489,672 A * | 12/1984 | Kisler ......................... | 118/620 |
| 4,513,683 A * | 4/1985 | Kisler ......................... | 118/620 |
| 4,830,887 A | 5/1989 | Reiter ......................... | 427/420 |
| 4,835,004 A | 5/1989 | Kawanishi ................... | 427/13 |
| 4,837,045 A | 6/1989 | Nakajima ..................... | 427/13 |
| 5,122,386 A * | 6/1992 | Yoshida ........................ | 427/520 |
| 5,290,600 A * | 3/1994 | Ord et al. .................... | 427/472 |
| 5,338,359 A * | 8/1994 | Conroy et al. .............. | 118/412 |
| 5,340,616 A * | 8/1994 | Amano et al. .............. | 427/458 |
| 5,733,608 A * | 3/1998 | Kessel et al. ............... | 427/547 |
| 5,837,324 A * | 11/1998 | Yapel et al. ................. | 427/402 |
| 6,117,236 A * | 9/2000 | Ruschak et al. ............ | 118/300 |
| 6,248,174 B1 | 6/2001 | Kustermann ................ | 118/665 |

FOREIGN PATENT DOCUMENTS

| | | |
|---|---|---|
| DE | 2054752 | 5/1971 |
| DE | 2219994 | 11/1973 |

(Continued)

*Primary Examiner*—Brenda A Lamb
(74) *Attorney, Agent, or Firm*—Taylor & Aust, PC

(57) ABSTRACT

A device (10) for the direct or indirect application of liquid or pasty application medium (16) to one or both sides of a material web (20), in particular of paper or board, comprises an applicator unit (12) which discharges the application medium (16) onto the material web (20) in the form of a free application medium jet (18). In this case, in the region of the applicator unit (12) there is provided a device (30) for producing an electric field, which exerts on the application medium jet (18) moving from the applicator unit (12) to the material web (20) a force which assists its movement. Additionally or alternatively, edge guiding elements can be provided, which guide the lateral edges of the application medium curtain (18) at least on part of its movement under the force of gravity.

32 Claims, 2 Drawing Sheets

FOREIGN PATENT DOCUMENTS

| | | |
|---|---|---|
| DE | 2824665 | 12/1979 |
| DE | 197 33 333 * | 2/1999 |
| DE | 19903559 | 10/1999 |
| WO | 889/05477 * | 6/1989 |
| WO | WO 89/05477 | 6/1989 |
| WO | WO 97/03009 | 1/1997 |

* cited by examiner

MEDIUM APPLICATION DEVICE

This is a continuation of application Ser. No. 10/221,517 filed Sep. 13, 2002 now abandoned.

The invention relates to a device for applying liquid or pasty application medium to one or both sides of a moving substrate, comprising an applicator unit which is arranged at a distance from the substrate and discharges the application medium onto the substrate in the form of a free application medium jet, the substrate, in the case of direct application, being the surface of a material web, in particular of paper or board and, in the case of indirect application, being the surface of a transfer element, preferably a transfer roll, which then transfers the application medium to the surface of the material web.

Although the invention can also advantageously be used in other application devices which operate "without contact", for example application devices having a free jet nozzle applicator unit, which discharges the application medium onto the substrate as an application medium jet which moves from the applicator unit to the substrate substantially on account of the expulsion momentum imparted to it by the applicator unit, the invention will be explained in more detail below using the example of a curtain application device, that is to say an application device in which the applicator unit discharges the application medium onto the substrate as a curtain or veil which moves substantially under the force of gravity.

In the coating of material webs by using a curtain applicator unit (also known as "curtain coating" in the specialist world), the application medium is discharged onto the substrate in the form of an application medium curtain, which moves from the applicator unit to the substrate substantially under the force of gravity. The fact that in this case the curtain applicator unit is located at a predetermined distance from the substrate has, inter alia, the advantage that it is exposed to a low risk of damage, for example in the event of a web break. Curtain applicator units differ fundamentally from other "non-contact" applicator units, for example free jet nozzle applicator units, in which the movement of the application medium from the applicator unit to the substrate is brought about primarily by the expulsion momentum from the discharge nozzle of the applicator unit, since the shape of the curtain emerging from the discharge nozzle is exposed only to the interplay between the surface tension of the application medium and the force of gravity. In this case, surface tension attempts to contract the curtain which, in relation to its volume or its cross-sectional area, has a very large surface or circumferential length, in order in this way to reduce its surface. This effect is opposed only by the force of gravity, which attempts to stretch the curtain. It can therefore easily be seen that it is all the more difficult to obtain an application medium curtain which is uniformly thick over the entire working width, the greater this working width is.

The coating of material webs by means of a curtain applicator unit, which supplies the material web with the application medium as an application medium curtain or veil that moves substantially under the force of gravity, has been known for a long time from the coating of photographic films, audio tapes and the like. However, the material webs in these areas of application have a considerably lower width than is the case in modern installations for the production of paper and paperboard webs, in which material web widths of more than 10 m are required. To be able to form an application medium curtain which is uniformly thick over this width and to keep it stable is a task in which it is anything but obvious to expect suggestions for a working solution from the comparatively simply controlled, known narrow application medium curtains. Furthermore, in modern installations for the production of paper and paperboard webs, the material webs move at speeds of up to 3.000 m/min, which is many times the speed at which the known narrow material webs move and, furthermore, constitutes a further high loading on the stability of the application medium curtain.

DE 199 03 559 A1 presents a whole series of principles of action which are intended to permit the air boundary layer carried along by the material web to be attenuated immediately upstream of a curtain applicator unit. However, this document does not discuss the possible ways of improving the efficiency of these principles of action.

WO 97/03009 tackles the problem of the drying of material webs following the application of media, specifically printing inks, in particular in gravure, web-fed offset and flexographic printing. It proposes to ionize the gas molecules on the surface of the material web by means of a corona discharge and to accelerate them toward an electrode, in order to increase the drying efficiency by the gas exchange at the material web surface which is associated with this "ion wind".

For completeness, reference should further be made to DE 198 03 240 A1 and DE 198 29 449 A1 in relation to the further prior art.

By contrast, it is an object of the present invention to further improve application devices which operate "without contact" for use in installations for the production and/or finishing of wide and fast-moving material webs, preferably of paper or board, in particular in relation to the stabilization of the application medium jet or curtain.

According to the invention, this object is achieved by a device for applying liquid or pasty application medium to one or both sides of a moving substrate, comprising an applicator unit which is arranged at a distance from the substrate and which discharges the application medium onto the substrate in the form of a free application medium jet, the substrate, in the case of direct application, being the surface of a material web, in particular of paper or board, and, in the case of indirect application, being the surface of a transfer element, preferably a transfer roll, which then transfers the application medium to the surface of the material web, and in the region of the applicator unit there being provided a device for producing an electric field, which exerts on the application medium jet moving from the applicator unit to the substrate a force which assists its movement.

As distinct from the above-described conventional "contactless" application devices, in particular curtain application devices, in the case of the application device according to the invention the application medium jet does not move from the discharge nozzle to the substrate solely under the influence of the force of gravity or solely under the influence of the expulsion momentum. Instead, this movement is assisted by an additional force which is exerted on the application medium jet by the field production device and attempts to stretch the jet on its path from the discharge nozzle to the substrate (pre-stretching). Therefore, in particular in "curtain coating applicator units", either the stability of the jet can be increased with the same distance between discharge nozzle and substrate or the distance between discharge nozzle and substrate can be chosen to be greater with a predefined desired jet stability.

The latter is advantageous in particular if it is considered that the total stretching of the application medium from a jet thickness determined by the width of the discharge nozzle down to the thickness of the layer of application medium ultimately applied to the substrate is composed of the product of the above-described pre-stretching of the jet on the path from the discharge nozzle to the substrate and the contact stretching, which is brought about by the difference between the speed of the jet immediately before it strikes the substrate and the speed of movement of the substrate at the point of contact between the application medium and the substrate. To achieve the most uniform application layer possible, it is specifically advantageous if the total stretch is composed as uniformly as possible of the pre-stretch and contact stretch. Since the application medium jet is all the more susceptible to external influences, for example to the influence of the air boundary layer carried along by the substrate, the longer the path of the application medium from the discharge nozzle to the substrate, in practice there is always the desire for the most intense pre-stretch possible.

Furthermore, the electric field also exerts on the application medium jet a force which has a component extending orthogonally to its direction of movement, that is to say the electrode arrangement attracts the application medium jet. This force component also helps to stabilize the application medium jet with respect to the influence of the air boundary layer carried along on the surface of the substrate.

The electric field that assists the force of gravity in accelerating the application medium jet can be produced in a straightforward manner by the applicator unit being kept at a first predetermined electric potential, while the substrate can be kept at a second predetermined electric potential, for example ground or earth potential. In this case, no additional electrodes need to be provided; instead it is sufficient to provide the existing devices with electrical connections.

Additionally or alternatively, however, an electrode arrangement can be provided on the upstream side of the applicator unit and in its vicinity, which is kept at a third predetermined electric potential. In this case, "additionally" means that both the applicator unit and the electrode arrangement are kept at a predetermined potential different from ground potential. On the other hand, "alternatively" means that only the electrode arrangement are kept at a predetermined potential different from ground potential, while the applicator unit is either grounded or floats with regard to its electric potential ("floating potential").

The electrode arrangement can comprise at least one flat electrode. In this case, the flat electrode can have a plurality of projections or needle points on its side pointing toward the substrate. Alternatively, however, it is also possible for the electrode arrangement to comprise a plurality of individual electrodes, preferably needle electrodes, arranged adjacent to one another in the transverse direction of the substrate. The use of needle points or needle electrodes means that the electrode arrangement is influenced not only by the electric field formed with respect to the ground potential but that, in addition, it is also possible for discharge processes to occur, during which the surrounding air is at least partly ionized, and the charge carriers formed in this way lead to the application medium jet, for example, being charged up. Following charging of this kind, the movement of the application medium jet can be influenced still more effectively by the electric field.

In a development of the invention, it is proposed that a device for producing an electric field be provided downstream of the point at which the application medium strikes the substrate. This electric field exerts on the application medium applied to the substrate a force which is directed toward the substrate and which, at locations at which too much application medium has been applied, leads to the excess application medium being displaced. In this way, firstly application medium is supplied to locations on the substrate which have hitherto not been covered, which improves the covering of the substrate with application medium. Secondly, the thickness of the application layer can be evened out in this way.

The further field producing device preferably has a further electrode arrangement which is adjacent to the substrate and which is preferably kept at a fourth predetermined electric potential.

However, such a force attracting the application medium applied to the substrate toward the substrate can in principle also result from residual charging of the application medium applied to the substrate, as a result of discharges induced by the first electrode arrangement.

The predetermined electric potential or potentials that is/are different from ground potential can, for example, have a value of between 5 kV and about 60 kV, preferably about 30 kV.

As already mentioned above, the substrate is preferably kept at ground potential. This can be implemented, for example, by a backing element, preferably a backing roll, which, in the case of direct application, supports the material web in the region of the applicator unit, or, in the case of indirect application, on the surface of which the applicator unit applies the application medium, being in contact with an electrode in order to keep said roll at the second predetermined electric potential. Additionally or alternatively, however, provision can also be made for the surface of the backing element, which is metallic or rubber-covered, for example, to be in wiping contact with the electrode. Finally, it is also further possible for the electrode to be in electrically conductive contact with a bearing shaft of the backing roll. In the case of direct application, a further alternative is added to this in that the material web is kept at the second predetermined electric potential, that is to say preferably ground potential, by means of an electrode formed, for example, as a web guide element.

In addition to the use of electric fields for influencing the application medium jet, other types of force fields are of course considered, for example magnetic fields, if the application medium in any case contains as a constituent part particles which respond to a magnetic field, or these particles can be added to the application medium for this purpose.

In order to be able to keep low the influence on the application medium jet of the air boundary layer carried along on the surface of the substrate, it is proposed that, in the direction of movement of the substrate, a device for attenuating the air boundary layer carried along by the substrate be arranged upstream of the electrode arrangement. In this case, the air boundary layer attenuation device can comprise a suction device, with the aid of which the air boundary layer can be removed actively from the moving substrate.

For example, a trailing scraper in wiping contact with the substrate can be provided at the downstream end of the suction device. This trailing scraper seals off the suction device with respect to the surroundings and prevents the onward movement of the air boundary layer toward the applicator unit. In this way, the air carried along in the air boundary layer is backed up, which at least partly destroys the laminar character of the flow of the air boundary layer. This makes it easier to extract and increases the suction efficiency of the suction device. Thus, the air boundary layer can be attenuated particularly effectively, if not even completely removed from the substrate, by the suction device designed in accordance with the invention.

The trailing scraper can be constructed as a flexible foil, preferably made of plastic, metal sheet or a composite material. The flexible foil nestles against the substrate under the suction action of the suction device, which firstly improves the sealing and secondly prevents the formation of a new air boundary layer. If the trailing scraper is fabricated from metal sheet, then use is preferably made of stainless steel sheet with a thickness of at most 0.1 mm. However, trailing scrapers made of composite material with a surface coating of Teflon have also proven to be advantageous. In this case, the composite material ensures the necessary temperature resistance and flexibility, while the Teflon surface coating ensures low friction between the trailing scraper and the moving substrate. Furthermore, the trailing scraper can be curved in the direction of movement, which facilitates its resilient compliance and further reduces the friction with the substrate.

In a development of the invention, it is proposed that in the region of the suction device, preferably between the downstream end of the suction device and the trailing scraper a further electrode arrangement be provided. With the aid of this further electrode arrangement, the air boundary layer carried along by the substrate can also be influenced and, in particular, attenuated. Above all, if the further electrode arrangement comprises a plurality of individual electrodes, preferably needle electrodes, arranged adjacent to one another in the transverse direction of the substrate, or if the further electrode arrangement comprises at least one flat electrode which has a plurality of projections or needle points on its side pointing toward the substrate, it is likewise possible for discharge processes to occur between the points of the further electrode arrangement and the substrate. These discharges disrupt the laminar disruption of the air boundary layer and convert the latter at least partly into a turbulent flow, which makes it easier to extract the air boundary layer and therefore further improves the effectiveness of the suction device. In order to assist the production of these discharges, it is proposed that the further electrode arrangement have a distance of between about 2 mm and about 30 mm from the substrate.

In principle, the further electrode arrangement can be connected to an external voltage supply. However, it is likewise possible, and even simpler to implement in constructional terms, if the electric potential of the further electrode arrangement is kept floating ("floating potential"). In this case, the further electrode arrangement is charged up as a result of the discharges originating from the first electrode arrangement, and is therefore likewise brought to a potential different from ground potential. In order to reduce the capacitance of the further electrode arrangement, and also for reasons of safety, it is proposed that the further electrode arrangement be arranged on the suction device electrically insulated from the latter.

According to a further point of view, the object of the invention is achieved by a device for applying liquid or pasty application medium to one or both sides of a moving substrate, comprising a curtain applicator unit which discharges the application medium onto the substrate as a curtain or veil moving substantially under the force of gravity, the substrate, in the case of direct application, being the surface of a material web, in particular of paper or board, and, in the case of indirect application, being the surface of a transfer element, preferably of a transfer roll, which then transfers the application medium to the surface of the material web, edge guiding elements being provided, which guide the lateral edges of the application medium curtain at least on part of its movement under the force of gravity between the curtain applicator unit and the substrate.

As already mentioned above, the surface tension of the application medium attempts to reduce the surface of the application medium jet, which has an effect in particular in the region of the side edges of the application medium jet and leads to jet contraction. This jet contraction can be prevented by the provision of edge guiding elements since, in this case, adhesion forces additionally act between the application medium and the surface of the edge guiding elements and oppose the tendency to contraction originating from the surface tension of the application medium. The adhesion between the edge guiding elements and the application medium can be improved by the surface characteristics of at least one edge guiding element being chosen such that the wetting or edge angle which depends on the characteristics of the application medium and the surface of the edge guiding elements is less than 90°. Furthermore, it is advantageous for the wetting of the edge guiding elements if the latter have a structured, surface. For this purpose, the surface of at least one edge guiding element can be roughened and/or have a toothed surface, for example in the form of an external thread or else an internal thread.

The edge guiding elements can be fabricated from glass or metal, for example, since these materials have a sufficiently high surface tension. In the case of metals, however, it must be noted that some metals have the tendency to adsorb water vapor from the atmosphere surrounding them, as a result of which their surface tension decreases to the value of the adsorbed water layer.

In order to be able to adapt the application device to the width of the material web to be coated, it is proposed that at least one edge guiding element be arranged such that it can be displaced in the transverse direction of the substrate, and/or that the angle which an edge guiding element forms with the vertical be adjustable. Furthermore, the ability to adjust the angle can include pivoting the free ends of the edge guiding elements in the transverse direction and/or in the longitudinal direction.

Finally, the action of the edge guiding elements can also be improved by providing an electric field, for example an electrode being provided in the vicinity of at least one of the edge guiding elements, preferably extending substantially parallel to the latter, and being kept at a predetermined electric potential.

The invention will be explained in more detail below using an exemplary embodiment and the appended drawing, in which.

Figure 1:
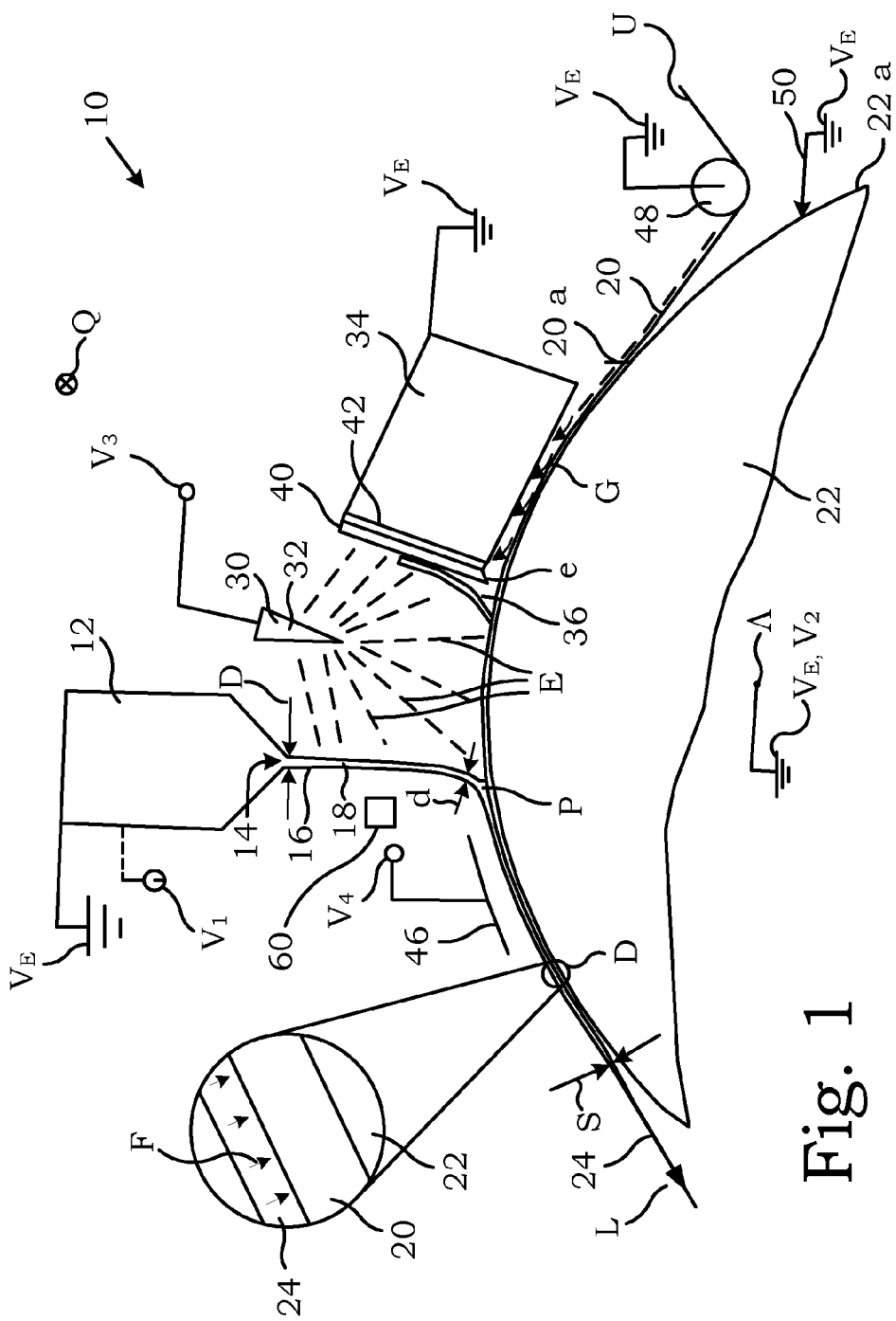
FIG. 1, shows a rough schematic side view to explain the construction and function of an application device according to the invention.

An application device according to the invention is designated generally by 10 in FIG. 1. It comprises a curtain applicator unit 12 having a discharge nozzle 14, from which the application medium 16 is discharged in the form of a curtain 18 onto a substrate U moving in the direction of movement L. In the exemplary embodiment illustrated, the substrate U is the surface 20*a* of a material web 20 which, in the region of the applicator unit 12, wraps partly around the circumferential surfaces of a supporting roll 22.

On its path from the discharge nozzle 14 to the substrate U, the application medium 16 is accelerated. This leads to a reduction in the thickness of the curtain 18 from the value D in the region of the discharge nozzle 14 to the value d immediately upstream of the position P at which it strikes the substrate U (pre-stretch). Because of the difference between the speed of the application medium curtain 18 immediately before the striking position P and the speed of movement of the substrate U, the application medium 16 is again stretched when it strikes the substrate U, so that the application layer 24 applied to the substrate U ultimately has the thickness s (contact stretch). The total stretch of the application medium 16 is given by the product of the stretch factors of pre-stretch and contact stretch.

In practice, the application medium 16 is generally stretched to a greater extent when it strikes the substrate U than on the path from the discharge nozzle 14 to the substrate U, since the falling distance between discharge nozzle 14 and substrate U cannot be selected to be arbitrarily large, with a view to the most stable curtain 18 possible. However, an excessively high contact stretch has a detrimental effect on the uniformity of the application layer 24 applied to the substrate U.

The application device 10 according to the invention now provides a possible way with the aid of which either with the same falling height between discharge nozzle 14 and substrate U the pre-stretch of the curtain 18 can be intensified or, given the same pre-stretch, the falling height between discharge nozzle 14 and substrate U can be reduced and therefore the curtain 18 can be stabilized. To be specific, according to the invention, the application medium curtain 18 is not left solely to the force of gravity on its path from the discharge nozzle 14 to the substrate U, but instead electrostatic forces are additionally exerted on it. This intensification of the forces stretching the curtain 18 results in higher stability of the application medium curtain 18, since the surface tension of the application medium 16, which attempts to contract the curtain 18 with the effect of reducing its surface, remains constant.

In principle, the electrostatic forces could be provided by a first specific electric voltage $V_1$ being applied to the housing of the applicator unit 12 and the supporting roll 22 being kept at earth or ground potential $V_E$ or $V_2$. In the exemplary embodiment according to FIG. 1, however, another route is followed, which is to be explained in more detail below:

According to FIG. 1, an electrode arrangement 30 is provided immediately upstream of the applicator unit 12 in the direction of movement L and, for example, can comprise a flat electrode extending in the transverse direction Q and having a plurality of needle points, or can be formed by a plurality of needle electrodes 32 arranged adjacent to one another in the transverse direction Q. A predetermined electric voltage $V_3$ is applied to the electrode arrangement 30, while the parts of the application device 10 which surround it, namely the applicator unit 12, the supporting roll 22 and a suction box 34 provided upstream of the electrode 30 with respect to the direction of movement L in order to attenuate an air boundary layer carried along by the material web 20, are kept at ground or earth potential $V_E$.

Between the electrode arrangement 30 and its surroundings, kept at ground potential, not only does an electric field build up but discharges occur between the needle points or needle electrodes 32 and the surroundings, which are indicated in FIG. 1 by the dashed lines E. Because of these discharges E, the application medium 16 of the curtain 18 is charged up electrically, so that, in the electric field between the electrode arrangement 30 and the supporting roll 22, it is accelerated toward the supporting roll 22, which assists the pre-stretching. A magnetic field device 60 is positioned to impart a magnetic field to the application medium to thereby influence the movement of the application medium.

Furthermore, however, because of the discharges E, a force is also exerted on the curtain 18 which has a component extending orthogonally to the falling movement direction of said curtain. This force component also helps to stabilize the application medium curtain 18 against the influence of the air boundary layer G carried along on the surface of the material web 20.

As already mentioned above, the suction box 34 is used to attenuate the air boundary layer G. In order to increase the suction efficiency, a trailing scraper 36 is provided on the outlet side of this suction box 34, which is in sliding contact with the surface 20a of the material web 20 and seals off the suction area of the suction box 34 on the outlet side. The trailing scraper 36 can be fabricated, for example, from a composite material coated with Teflon. Because of the use of a composite material, the trailing scraper 36 has adequate temperature resistance and flexibility and, because of the surface coating with Teflon, has an adequately low friction.

According to the invention, a further electrode arrangement 40 is now provided between this trailing scraper 36 and the suction box 34, and is fitted to the suction box 34 via an electrical insulator 42. The further electrode arrangement 40 can again be formed either by a flat electrode having a plurality of needle points or a plurality of needle electrodes arranged adjacent to one another in the transverse direction Q. In principle, the electrode arrangement 40 can be connected to an external voltage supply. However, in the exemplary embodiment illustrated, it is in a floating state with regard to its electric potential ("floating potential"), but, because of the discharges E originating from the electrode arrangement 30, it is charged up and therefore likewise brought to a potential different from ground potential.

Because of the short distance of the points of the electrode arrangement 40 from the substrate U, the charging up of the electrode arrangement 40 is sufficient to permit discharges e likewise to occur between the points of the electrode arrangement 40 and the substrate U. These discharges e disrupt the laminar flow of the air boundary layer G and convert said flow, at least partly, into a turbulent flow. This makes it easier to suck the air boundary layer G away from the surface 20a of the material web and therefore improves the effectiveness of the suction box 34.

Finally, electrical forces can also further contribute to improving the equalization and fixing of the application layer 24 on the material web 20. For this purpose, for example, a further electrode arrangement in the form of a plate electrode 46 can be provided, which is kept at a predetermined electric potential $V_4$. Between this plate electrode 46 and the supporting roll 22 kept at ground potential there forms a relatively homogeneous electric field, which exerts on the application medium a force directed toward the substrate U. At locations on the material web surface 20a to which too much application medium 16 has been applied, this force ensures the displacement of the excess application medium and therefore evening of the application layer 24. In the extreme case, it is even possible for regions of the material web surface 20a that have hitherto not been covered to be covered with application medium 16 for the first time as a result of this force. Furthermore, the force mentioned above also improves the bond which incorporates the application medium 16 with the surface 20a of the material web 20.

It should further be noted that the charging which the application medium 16 experiences in the region of the curtain 18 as a result of the discharges E, in interaction with the supporting roll 22 kept at ground potential, leads to such a force directed toward the substrate U. This is indicated by the arrows F in the enlarged illustration of the detail D.

The supporting roll 22 can be kept at the ground potential $V_E$ in different ways. For example, the roll shaft A can be connected to a wiping contact, as described in DE 197 33 333 A1, for example. Additionally or alternatively, however, a wiping contact 50 connected to the surface 22a of the roll 22 can also be provided. Finally, the material web 20 can also be kept at ground potential $V_E$ via contacts formed, for example, by web guide elements 48.

Figure 2:
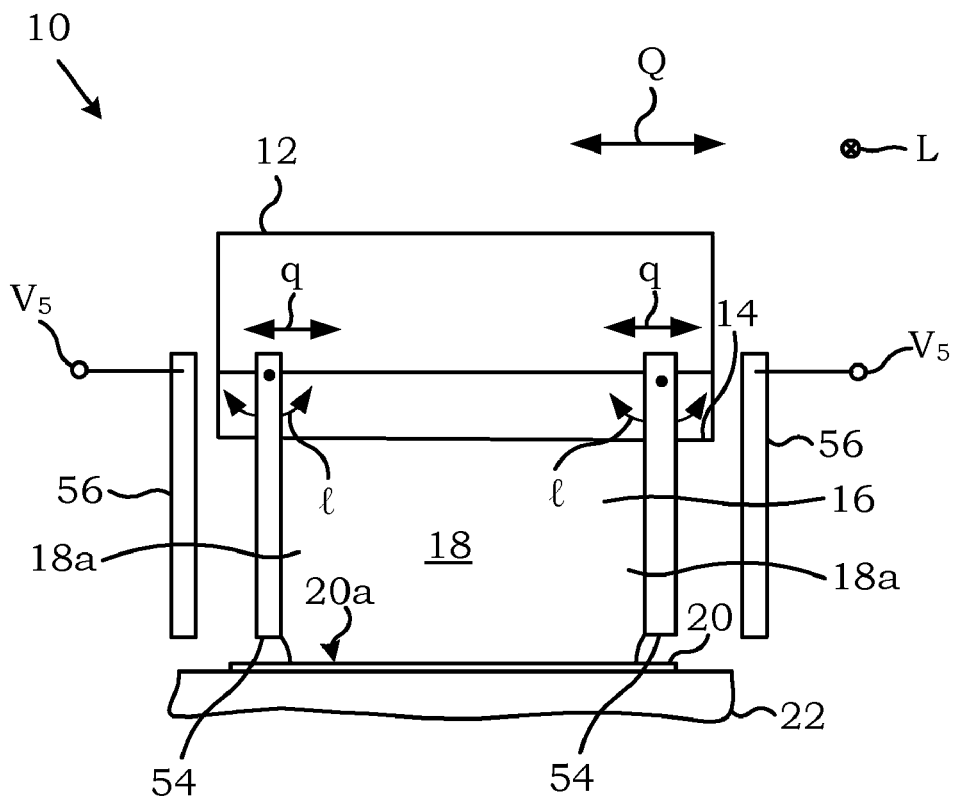
FIG. 2 shows a schematic view to explain the construction and function of the edge guiding elements.
Figure 3:
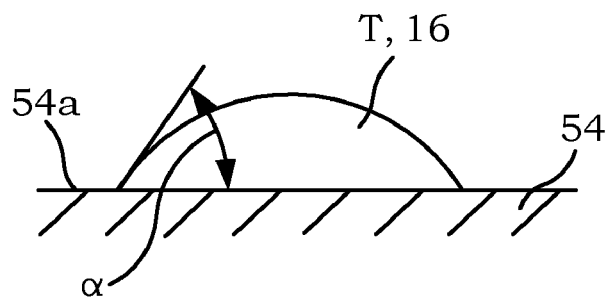
FIG. 3 shows an illustration to explain the term "wetting angle" or "edge angle".

FIG. 2 illustrates a view of the application device 10 taken with the direction of view in the direction of movement L. Using this illustration, an explanation will be given of a possible way in which the application medium curtain 18 can also be stabilized in the region of its side edges 18a. This is because the surface tension of the application medium 16 which attempts to contract the curtain 18 acts primarily in the edge regions 18 of the curtain 18. There, it leads to lateral contraction of the curtain 18 and thickening of the latter. In order to counteract this effect, in the embodiment illustrated in FIG. 2, guide strips 54 are provided which are fitted to the applicator unit 12 in such a way that they catch the curtain 18 emerging from the discharge nozzle 14 and guide it on its falling path until immediately before the surface 20a of the material web 20.

The action of the edge strips 54 is based on the adhesion forces between the application medium 16 and the surface of the edge strips 54. With regard to the best possible adhesion, the edge angle or wetting angle α of a droplet T of application medium 16 on the surface 54a of the edge strips 54 should have the lowest possible value. This can be achieved, for example, by the surface of the edge strips 54 being produced from a material with a high surface tension. Furthermore, the wetting between application medium 16 and edge strips 54 can be improved by a roughened, for example toothed, surface structure of the edge strips 54. This can be achieved, for example, by threaded rods being used as edge strips 54.

One further possible way of being able to improve the adhesion of the application medium 16 at the edge strips 54 is for electrode strips 56 to be provided substantially parallel to the edge strips 54, to which strips a predetermined electric voltage $V_5$ is applied. As a result, in a way similar to that described above for the arrangement according to FIG. 1, an attractive force is exerted on the application medium.

In order to be able to adapt the edge strips 54 to the respectively desired working width, that is to say the respectively present width of the material web 20, said edge strips 54 are arranged on the applicator unit 12 such that they can be displaced in the transverse direction Q, which is indicated by the arrows q in FIG. 2. Furthermore, the edge strips 54 can also be arranged on the applicator unit 12 such they can be pivoted, specifically about axes running substantially parallel to the longitudinal direction L and/or to the transverse direction Q, the arrows 1 in FIG. 2 merely indicating the ability to pivot in the transverse direction Q, that is to say about an axis running substantially parallel to the longitudinal direction L.

The invention claimed is:

1. A device for applying at least one of liquid and pasty application medium to at least one side of a moving substrate, comprising:
an applicator unit arranged at a distance from the substrate, said applicator unit discharging the application medium onto the substrate as a free application medium jet, said applicator unit being kept at a first predetermined electric potential, the substrate proximate to said applicator unit being kept at a second predetermined electric potential thereby producing an electric field, which exerts a force on said application medium jet as it moves from said applicator unit to the substrate, said force assisting in the movement of said application medium jet, wherein the substrate is one of a surface of a material web and a surface of a transfer roll;
wherein said applicator unit is a curtain applicator unit, said application medium jet being an application medium curtain that discharges the application medium onto the substrate, said application medium curtain moves from said curtain applicator unit to the substrate substantially under the force of gravity;
a first electrode arrangement for attenuating an air boundary layer carried along by said substrate;
a suction box; and
a trailing scraper, said first electrode arrangement being positioned between said suction box and said trailing scraper, said first electrode arrangement, said suction box, and said trailing scraper being positioned on an upstream side of said applicator unit.

2. A device for applying at least one of liquid and pasty application medium to at least one side of a moving substrate, comprising:
an applicator unit arranged at a distance from the substrate, said applicator unit discharging the application medium onto the substrate as a free application medium jet, said applicator unit being kept at a first predetermined electric potential, the substrate proximate to said applicator unit being kept at a second predetermined electric potential thereby producing an electric field, which exerts a force on said application medium jet as it moves from said applicator unit to the substrate, said force assisting in the movement of said application medium jet, wherein the substrate is one of a surface of a material web and a surface of a transfer roll;
wherein said applicator unit is a free jet nozzle applicator unit moving said application medium to the substrate substantially by way of expulsion momentum imparted by said free jet nozzle applicator unit;
a first electrode arrangement for attenuating an air boundary layer carried along by said substrate;
a suction box; and
a trailing scraper, said first electrode arrangement being positioned between said suction box and said trailing scraper, said first electrode arrangement, said suction box, and said trailing scraper being positioned on an upstream side of said applicator unit.

3. A device for applying at least one of liquid and pasty application medium to at least one side of a moving substrate, comprising:
an applicator unit arranged at a distance from the substrate, said applicator unit discharging the application medium onto the substrate as a free application medium jet, said applicator unit being kept at a first predetermined electric potential, the substrate proximate to said applicator unit being kept at a second predetermined electric potential thereby producing an electric field, which exerts a force on said application medium jet as it moves from said applicator unit to the substrate, said force assisting in the movement of said application medium jet, wherein the substrate is one of a surface of a material web and a surface of a transfer roll;
wherein said applicator unit is a curtain applicator unit, said application medium jet being an application medium curtain that discharges the application medium onto the substrate, said application medium curtain moves from said curtain applicator unit to the substrate substantially under the force of gravity;

a first electrode arrangement for attenuating an air boundary layer carried along by said substrate;

a suction box;

a trailing scraper, said first electrode arrangement being positioned between said suction box and said trailing scraper; and a second electrode arrangement located on an upstream side of said applicator unit, said second electrode arrangement proximate to said applicator unit and located at a distance from the substrate, said second electrode arrangement being at a third predetermined electrical potential, said second electrode arrangement altering an electrical potential of said application medium curtain as it moves to the substrate, said first electrode arrangement, said suction box, and said trailing scraper being positioned on an upstream side of said second electrode arrangement.

4. A device for applying at least one of liquid and pasty application medium to at least one side of a moving substrate, comprising:

an applicator unit arranged at a distance from the substrate, said applicator unit discharging the application medium onto the substrate as a free application medium jet;

an electrode arrangement located on an upstream side of said applicator unit, said electrode arrangement proximate to said applicator unit and located at a distance from the substrate, said electrode arrangement being at a predetermined electrical potential thereby producing an electric field, which exerts a force on said application medium jet as it moves from said applicator unit to the substrate, said force assisting in the movement of said application medium jet, wherein the substrate is one of a surface of a material web and a surface of a transfer roll;

a floating potential electrode receiving an electrical field from said electrode arrangement and imparting an electric field to the moving substrate, said floating potential electrode for attenuating an air boundary layer carried along by said substrate;

a suction box; and a trailing scraper, said floating potential electrode being positioned between said suction box and said trailing scraper, said floating potential electrode, said suction box, and said trailing scraper being positioned on an upstream side of said electrode arrangement.

5. The device of claim 4, wherein said electrode arrangement includes at least one flat electrode having a side with a plurality of at least one of projections and needle points directed toward the substrate.

6. The device of claim 4, wherein said electrode arrangement includes a plurality of individual electrodes arranged adjacent to one another in a direction transverse to the substrate.

7. The device of claim 4, further comprising an electric field producing device located downstream of said application unit, said electric field producing device producing a force that is exerted on the application medium and directed toward the substrate.

8. The device of claim 7, wherein said predetermined electric potential is a third electrical potential, said application unit being at a first predetermined electric potential, said substrate being at a second predetermined potential, said electric field producing device having an other electrode arrangement adjacent to the substrate, said other electrode arrangement being at a fourth predetermined electric potential.

9. The device of claim 8, wherein at least one of said first predetermined electric potential, said third predetermined electric potential and said fourth predetermined electric potential has an electric potential of between approximately 5 kV and approximately 60 kV.

10. The device of claim 9, wherein at least one of said first predetermined electric potential, said third predetermined electric potential and said fourth predetermined electric potential has an electric potential of approximately 30 kV.

11. The device of claim 8, wherein said second predetermined electric potential is at ground potential.

12. The device of claim 8, further comprising an electrode formed as a web guide element, said substrate being said material web kept at said second electrical potential by said web guide element.

13. The device of claim 7, further comprising:

a backing element being one of in contact with said material web and being said surface of said transfer roll; and an electrode in contact with said backing element keeping said backing element at said second predetermined electric potential.

14. The device of claim 13, wherein said backing element is in wiping contact with said electrode.

15. The device of claim 13, further comprising a bearing shaft, said backing element being a backing roll, said backing roll connected to said bearing shaft, said electrode being in contact with said bearing shaft.

16. A device for applying at least one of liquid and pasty application medium to at least one side of a moving substrate, comprising:

an applicator unit arranged at a distance from the substrate, said applicator unit discharging the application medium onto the substrate as a free application medium jet;

an electrode arrangement located on an upstream side of said applicator unit, said electrode arrangement proximate to said applicator unit and located at a distance from the substrate, said electrode arrangement being at a predetermined electrical potential thereby producing an electric field, which exerts a force on said application medium jet as it moves from said applicator unit to the substrate, said force assisting in the movement of said application medium jet, wherein the substrate is one of a surface of a material web and a surface of a transfer roll;

an attenuating device that attenuates an air boundary layer that is carried along with the substrate upstream of said electrode arrangement, said attenuating device including a suction device; and a trailing scraper in wiping contact with the substrate downstream of said suction device.

17. The device of claim 16, further comprising an other electrode arrangement proximate to said attenuation device.

18. The device of claim 17, wherein said suction device has a downstream end, said other electrode arrangement being positioned between said downstream end of said suction device and said trailing scrapper.

19. The device of claim 17, wherein said other electrode arrangement includes a plurality of individual electrodes arranged adjacent to one another in a direction transverse to the substrate.

20. The device of claim 17, wherein said other electrode arrangement includes at least one flat electrode having a side with a plurality of at least one of projections and needle points directed toward the substrate.

21. The device of claim 17, wherein said other electrode arrangement has a distance from the substrate of between approximately 2 mm and approximately 30 mm.

22. The device of claim 17, wherein said other electrode arrangement has a floating electrical potential.

23. The device of claim 17, wherein said other electrode arrangement is connected to said attenuation device, said electrode arrangement being electrically insulated from said attenuation device.

24. The device of claim 17, wherein at least one of said applicator unit and said attenuation device is kept at a ground potential.

25. A device for applying at least one of liquid and pasty application medium to at least one side of a moving substrate, comprising:
   a curtain applicator unit that discharges the application medium onto the substrate as a curtain, said curtain moving from said curtain applicator unit to the substrate substantially under the force of gravity;
   a plurality of edge guiding elements that guide lateral edges of said curtain, at least one of said edge guiding elements having a surface being one of roughened and toothed, wherein the substrate is one of a surface of a material web and a surface of a transfer roll; and
   an electrode arrangement altering an electric potential of said curtain as it moves from said curtain applicator unit to the moving substrate, said electrode arrangement including at least one electrode strip positioned substantially parallel with at least one of said plurality of edge guiding elements.

26. The device of claim 25, wherein at least one said guiding element has a wetting angle, which depends on characteristics of the application medium and said surface of said at least one guiding element, said wetting angle being less than 90°.

27. The device of claim 25 wherein at least one said guiding element is fabricated from one of glass and metal.

28. A device for applying at least one of liquid and pasty application medium to at least one side of a moving substrate, comprising:
   a curtain applicator unit that discharges the application medium onto the substrate as a curtain, said curtain moving from said curtain applicator unit to the substrate substantially under the force of gravity;
   a plurality of edge guiding elements that guide lateral edges of said curtain, at least one of said edge guiding elements having a surface being one of roughened and toothed, wherein the substrate is one of a surface of a material web and a surface of a transfer roll, at least one said guiding element including an external thread; and
   at least one electrode strip positioned substantially parallel with at least one of said plurality of edge guiding elements.

29. A device for applying at least one of liquid and pasty application medium to at least one side of a moving substrate, comprising:
   a curtain applicator unit that discharges the application medium onto the substrate as a curtain, said curtain moving from said curtain applicator unit to the substrate substantially under the force of gravity;
   a plurality of edge guiding elements that guide lateral edges of said curtain, at least one of said edge guiding elements having a surface being one of roughened and toothed, wherein the substrate is one of a surface of a material web and a surface of a transfer roll, at least one of said guiding elements being displaceable in a direction transverse to the substrate; and
   at least one electrode strip positioned substantially parallel with at least one of said plurality of edge guiding elements.

30. A device for applying at least one of liquid and pasty application medium to at least one side of a moving substrate, comprising:
   a curtain applicator unit that discharges the application medium onto the substrate as a curtain, said curtain moving from said curtain applicator unit to the substrate substantially under the force of gravity;
   a plurality of edge guiding elements that guide lateral edges of said curtain, at least one of said edge guiding elements having a surface being one of roughened and toothed, wherein the substrate is one of a surface of a material web and a surface of a transfer roll, at least one of said guiding elements being angularly adjustable; and
   at least one electrode strip positioned substantially parallel with at least one of said plurality of edge guiding elements.

31. A device for applying at least one of liquid and pasty application medium to at least one side of a moving substrate, comprising:
   a curtain applicator unit that discharges the application medium onto the substrate as a curtain, said curtain moving from said curtain applicator unit to the substrate substantially under the force of gravity;
   a plurality of edge guiding elements that guide lateral edges of said curtain, at least one of said edge guiding elements having a surface being one of roughened and toothed, wherein the substrate is one of a surface of a material web and a surface of a transfer roll; and
   an electrode arrangement altering an electric potential of said curtain as it moves from said curtain applicator unit to the moving substrate, said electrode arrangement including at least one electrode strip positioned substantially parallel with at least one of said plurality of edge guiding elements, said at least one electrode strip proximate to at least one of said guiding elements, said at least one electrode strip kept at a predetermined electric potential.

32. A device for applying at least one of liquid and pasty application medium to at least one side of a moving substrate, comprising:
   a curtain applicator unit that discharges the application medium onto the substrate as a curtain, said curtain moving from said curtain applicator unit to the substrate substantially under the force of gravity;
   a plurality of edge guiding elements that guide lateral edges of said curtain, at least one of said edge guiding elements having a surface being one of roughened and toothed, wherein the substrate is one of a surface of a material web and a surface of a transfer roll; and an electrode proximate to at least one of said guiding elements, said electrode kept at a predetermined electric potential, said electrode extending substantially parallel with at least one of said guiding elements.

* * * * *

UNITED STATES PATENT AND TRADEMARK OFFICE
CERTIFICATE OF CORRECTION

PATENT NO. : 7,247,206 B2
APPLICATION NO. : 10/802495
DATED : July 24, 2007
INVENTOR(S) : Méndez-Gallon et al.

It is certified that error appears in the above-identified patent and that said Letters Patent is hereby corrected as shown below:

On the Title Page Item (12)
Under "United States Patent", please delete "Benjamin et al.", and substitute therefor --Méndez-Gallon, et al.--;

Item (75)
Under "Inventors", please delete "Méndez-Gallon Benjamin", and substitute therefor --Benjamin Méndez-Gallon-- and delete "Ueberschär Manfred", and substitute therefor --Manfred Ueberschär--;

On the Title Page Item (30)
After the Related U.S. Application Data, please insert --Foreign Application Priority Data, March 14, 2000 (DE) 100 12 253--.

Signed and Sealed this

Fifteenth Day of December, 2009

David J. Kappos
*Director of the United States Patent and Trademark Office*